United States Patent [19]
Brown

[11] 4,043,482
[45] Aug. 23, 1977

[54] RE-USABLE CONTAINERS

[75] Inventor: Timothy John Brown, Wokingham, England

[73] Assignee: In. Da. Te. Aktiengesellschaft, Eschen, Liechtenstein

[21] Appl. No.: 651,016

[22] Filed: Jan. 21, 1976

[51] Int. Cl.² .............................................. B65D 39/00
[52] U.S. Cl. ................................................... 220/307
[58] Field of Search .............. 220/306, 307, 308, 281, 220/282

[56] References Cited

U.S. PATENT DOCUMENTS

| | | | |
|---|---|---|---|
| 909,230 | 1/1909 | Ruchti | 220/307 |
| 3,109,346 | 11/1963 | Julow | 220/306 |
| 3,262,602 | 7/1966 | McConnell | 220/307 |
| 3,460,711 | 8/1969 | AlRoy | 220/307 |
| 3,556,339 | 1/1971 | Lind | 220/306 |
| 3,566,946 | 3/1971 | MacDonald | 220/306 |
| 3,737,068 | 6/1973 | Bird | 220/306 |
| 3,811,597 | 5/1974 | Frankenberg | 220/306 |
| 3,840,152 | 10/1974 | Hodge | 220/306 |
| 3,912,110 | 10/1975 | Hammes | 220/307 |

FOREIGN PATENT DOCUMENTS

| | | | |
|---|---|---|---|
| 743,795 | 5/1963 | Canada | 220/307 |
| 1,100,883 | 4/1902 | France | 220/306 |
| 585 | 3/1915 | Netherlands | 220/306 |
| 499,076 | 1/1939 | United Kingdom | 220/306 |

*Primary Examiner*—Ro E. Hart
*Attorney, Agent, or Firm*—Sughrue, Rothwell, Mion, Zinn and Macpeak

[57] ABSTRACT

A re-usable container for storing and transporting food products, comprises an open-ended body with a mouth ring attached to an open end. The mouth ring is thicker than the container body wall, and its internal surface is shaped to receive and to latch over a flange on a closure for that open end.

9 Claims, 9 Drawing Figures

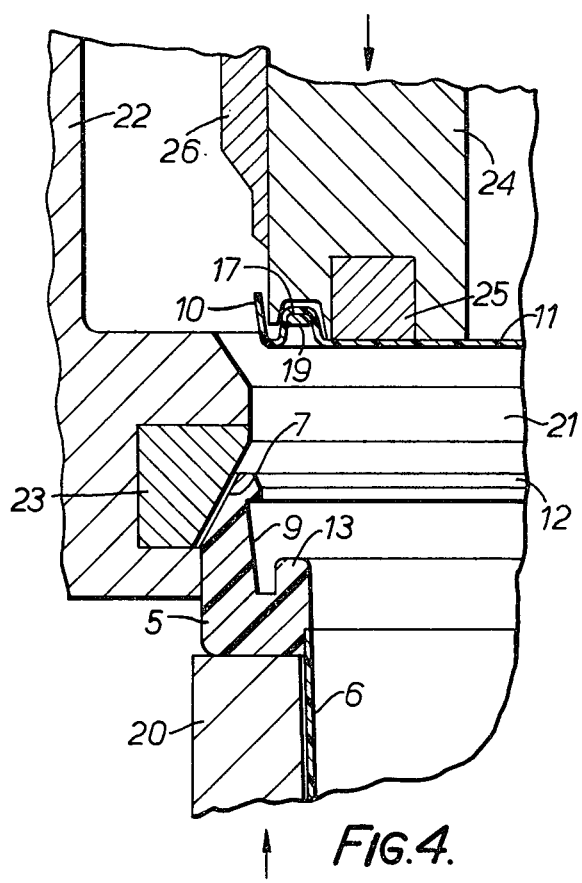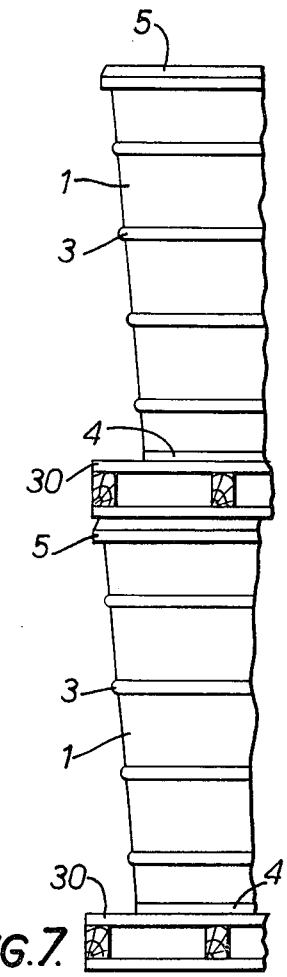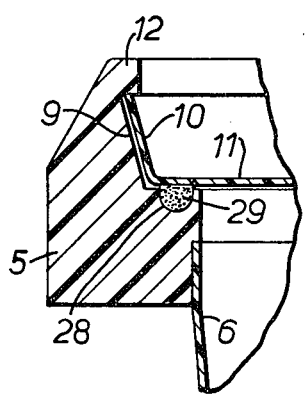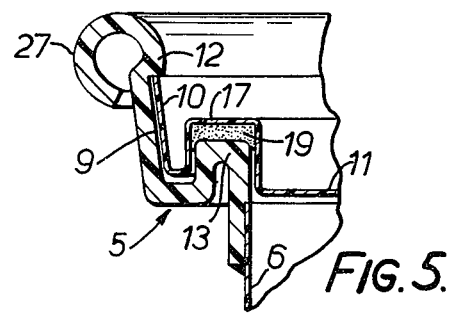

RE-USABLE CONTAINERS

BACKGROUND OF THE INVENTION

This invention relates to re-usable containers, in particular containers having an open-ended body of the kind which are employed for transporting and storing food products.

Some basic food products in a liquid form, for example tomato paste or fruit pulp, are produced immediately after harvesting of the crop and are then transported in containers, sometimes over very great distances, to the factories where they are processed as ingredients of foodstuffs, for example tomato ketchup or jam.

The containers used have customarily been nonreturnable drums which are filled with the basic food products under aseptic conditions, and are discarded as scrap or need remaking after emptying at the factory.

It is a main object of the present invention to provide an open-ended container which is re-usable, which has a simple closure, and which can be cleaned easily after use and then transported back to the crop-growing region for refilling.

SUMMARY

A re-usable container of the invention has an open-ended body and a mouth ring attached to an open end of the body which ring is thicker than the body wall of the container. The internal surface of the mouth ring is shaped to receive and to lock in position an upstanding peripheral flange on a closure for the open end of the container body.

So that the containers can be easily transported back to the crop-growing region it is preferred that they be shaped to nest into each other.

The inner surface of the mouth ring is preferably formed with an outwardly sloping face which extends upwardly for receiving said upstanding peripheral flange. An inwardly directed annular barb at the top of that face latches over the edge of said peripheral flange.

The invention also comprehends such a container in combination with a closure having an upstanding peripheral flange for pressing into the inner surface of the mouth ring and latching beneath said annular barb, and a resilient seal for compression between the closure and an annular surface of the mouth ring.

The mouth ring may be formed with an upstanding annular shoulder located inwardly of said outwardly sloping face, for fitting into an annular recess in the closure.

BRIEF DESCRIPTION OF THE DRAWINGS

Some embodiments of the invention will now be described, by way of example, with reference to the accompanying drawings, in which:

FIG. 4 illustrates the way in which the closure of FIG. 3 is pressed into the container mouth ring, FIG. 5 is a sectional detail of a mouth ring with a shoulder similar to that of FIG. 3 but with the mouth ring formed from a metal strip, FIG. 6 is a sectional detail of another embodiment of the mouth ring similar to FIG. 3 but with an O-ring seal in the mouth ring, FIG. 7 illustrates how the full containers may be transported on pallets.

DESCRIPTION OF THE PREFERRED EMBODIMENTS

Figure 1:
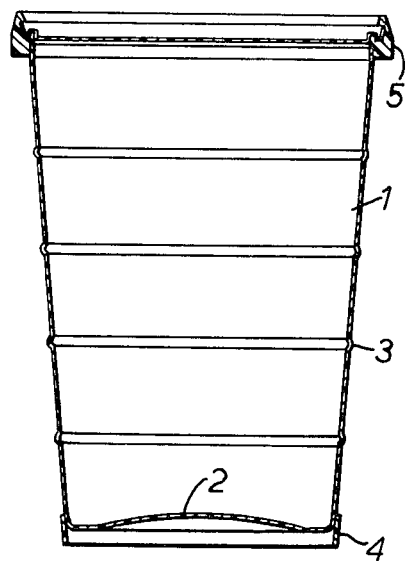
FIG. 1 is a sectional elevation of a re-usable container according to the invention.
Figure 2:
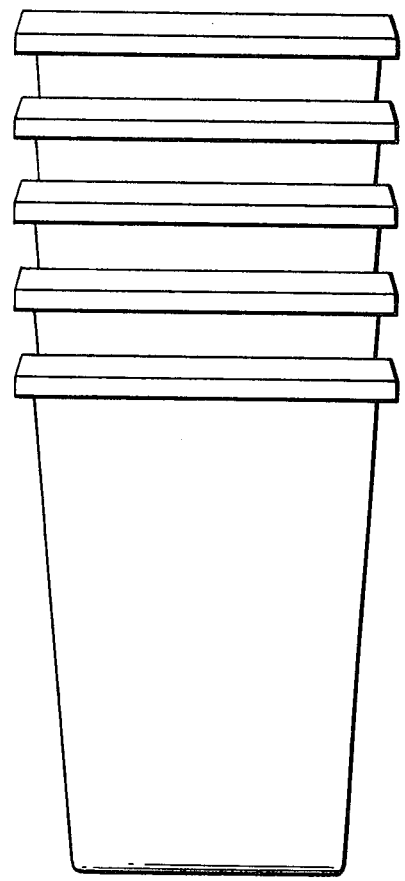
FIG. 2 illustrates diagrammatically the stacking of a nest of such containers when empty.

Referring to FIGS. 1 and 2 of the drawings, a re-usable container according to the invention has an open-ended body 1 and a dished base 2 which is integral with the body 1. The body 1 is of conical shape and diverges from the base 2 towards the open upper end of the container.

The body 1 and the base 2 are formed from a strong material which can be readily cleaned, for example high quality stainless steel sheet or aluminium sheet. Strengthening rings 3 are formed at intervals around the body 1. These rings protrude outwardly from the body wall. A metal base ring 4 is welded to the base of the container to act as a stand and to protect the base 2 during rough handling.

The divergence of the body wall is such that a number of containers when empty can nest into each other to form a stack, as illustrated in FIG. 2, which can be transported back to the crop growing region for refilling. In FIG. 2 five containers nesting into each other form a manageable stack. The internal shape of the container is such that where the rings 3 are formed and at the bottom corners where the body wall 1 joins the base 2 there is sufficient radius to facilitate easy cleaning.

A massive mouth ring 5 of gasket material, for example a natural or synthetic rubber or stainless steel, encircles the upper end 6 of the body wall 1 of the container. The mouth ring 5, in this embodiment, is much thicker than the body wall of the container and is bonded to the upper end 6 of the body wall, using an adhesive or by welding as appropriate. The outer surface 7 of the mouth ring 5 is shaped to cooperate with filling apparatus, as will be described with reference to FIG. 4 and the inner surface of the mouth ring is recessed as indicated generally at 8.

The recess in the inner surface of the mouth ring 4 is formed with an outwardly sloping face 9, for example at an angle of 10° to the vertical, which extends upwardly for receiving an upstanding peripheral flange 10 of a closure 11 which is shaped to match the sloping face 9 of the mouth ring and can be forced into the open mouth ring 5. The closure 11 is held in the mouth ring by an inwardly directed annular barb 12 at the top of the sloping face 9, which barb 12 latches over the upper edge of the flange 10 when the closure is pressed into sealing engagement with the mouth ring.

The bottom of the recess 8 in the mouth ring 5 is formed with an upstanding annular shoulder 13 which is located inwardly of the outwardly sloping face 9. The inner face 14 of the shoulder 13 forms an upward extension of the inner surface of the upper end 6 of the container body. The shoulder 13 has an upwardly-facing surface 15, and is spaced from the face 9 by an annular channel 16.

The closure 11 has a specially shaped periphery including an annular recess 17 which fits over the shoulder 13 and an annular ridge 18 at the bottom of the sloping face 9, which ridge fits into the channel 16 in the mouth ring. A resilient member 19 adheres to the undersurface of the closure in the annular recess 17 so as to be compressed on to the shoulder 13 when the closure 11 is latched in sealing position in the mouth ring.

The closure 11 may be of any suitable material compatible with the material of the body of the container 10 and with the product to be transported in the container. Usually the closure 11 is formed of ordinary tin-plate material of the kind used for the manufacture of cans for food products.

The way in which the closure 11 is inserted into the mouth ring 5 is illustrated in FIG. 4. A container 1 is supported in a holding ring 20 which fits underneath the mouth ring 5 and is raised to raise the container into engagement with a filling aperture 21 in a filling machine, at which the container is filled under aseptic conditions. Part of the frame work of the machine is indicated at 22. The chamfered surface 7 on the outside of the mouth ring 5 bears against a matching surface on a ring 23 of sealing material, for example synthetic rubber, which extends around the filling aperture 21.

The closure 11 is held against the bottom surface of a cylinder plunger 24, by inset magnets one of which is shown at 25. The plunger 24 slides in a sleeve 26 which is lowered with the plunger 24 as the plunger presses the closure 11 down through the mouth ring 5 so that the flange 10 of the closure snaps beneath the barb 12 and the sealing member 19 is pressed into sealing engagement with the shoulder 13. When the closure 11 is latched in position the sleeve 26 is moved downwardly relative to the plunger 24 to hold the closure 11 in position as the plunger 24 is withdrawn. The sleeve 26 is then withdrawn and the support ring 20 is lowered and the sealed container is released from the filling machine.

Figure 3:
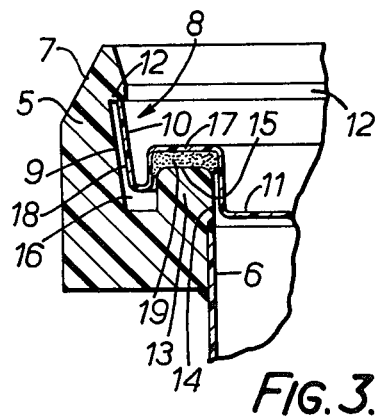
FIG. 3 is a sectional detail of a mouth ring encircling the upper end of the container of FIG. 1 with a closure interlocking with the mouth ring.

FIG. 5 illustrates a similar sealing and interlocking arrangement to that of FIG. 3. In this embodiment however the mouth ring 5 of the container is rolled from a thick strip of the same metal as the container to form both the shoulder 13, an upwardly sloping face 9 a turned-over rim 27, and a barb 12 for latching over the upstanding flange 10 of the closure. The rolled metal mouth ring 5 is welded to the upper edge 6 of the container, and the sheet from which the mouth ring is formed is thicker than the body wall of the container.

In the embodiment of FIG. 6, the bottom of the recess 8 in the mouth ring 5 is formed with an upwardly-facing groove 28 which constitutes a seating for an O-ring 29 of resilient sealing material. The closure 11 is of simpler design with a flat bottom which is pressed into sealing engagement with the O-ring 29 when the flange 10 is latched beneath the barb 12.

The filled containers can be stacked on pallets 30 in the manner shown in FIG. 7 for transporting to the processing factory, and at the factory the containers are easily opened by means of a plunger which presses downwardly on the centre of the closure to deform the closure and cause the peripheral flange 10 to be released from the barb 12.

Figure 8:
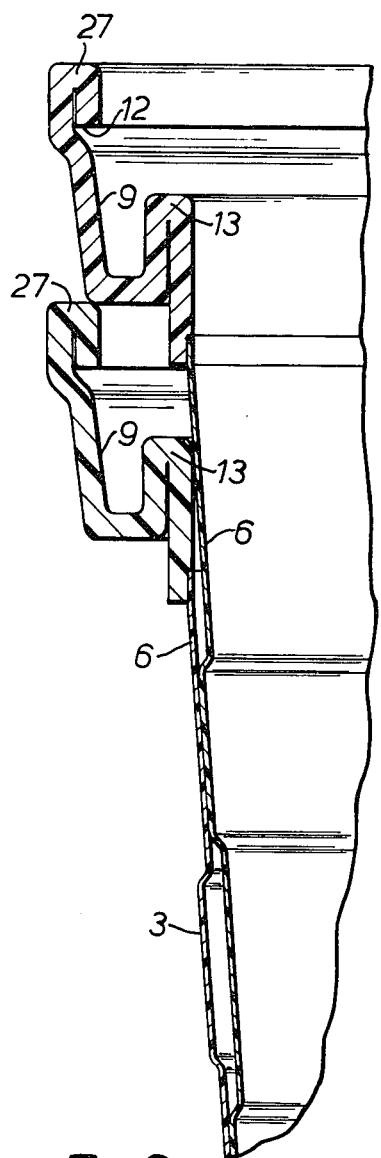
FIG. 8 illustrates another embodiment of the mouth ring similar to FIG. 5, and shows two empty containers nested closely into each other.

Another embodiment of the invention is illustrated in FIG. 8. The mouth ring is similar to that illustrated in FIG. 5, and is rolled from a thick strip of the same metal as the container. The folded metal forming the shoulder 13 is closed up, and the rim 27 is turned-over inwardly and is closed up. The lower edge of the rim 27 forms the barb 12 beneath which the flange 10 of the closure is latched.

Figure 9:
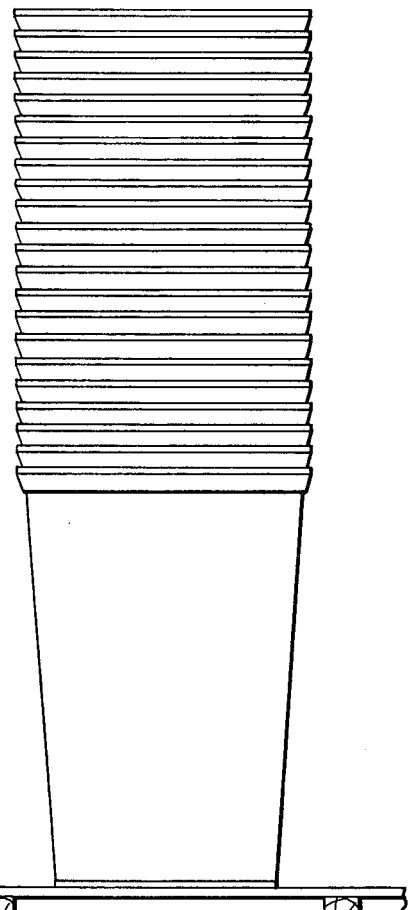
FIG. 9 illustrates the stacking of a large number of empty containers of the kind illustrated in FIG. 8.

FIG. 8 shows how this construction permits the empty containers to be nested closely into each other with the bottom of the mouth ring of one container resting on the top of the rim of the mouth ring of the next lower container. This enables a stack of a large number of the empty containers to be built, for example twenty two empty containers as illustrated in FIG. 9.

Containers according to the invention may be open at both ends. That is, instead of the integral base 2 there would be a mouth ring similar to the mouth ring 5 around the lower end of the container with a closure locked into the lower end prior to filling, then the container would be filled under aseptic conditions as before and sealed with an upper closure. When the container had been emptied both end closures could be removed and this facilitates cleaning of the body of the container before it is returned for refilling.

In each of the embodiments the mouth ring is of massive construction and is much thicker than the body wall of the container. This provides strengthening of the end or ends of the container as well as resilience which assists locking of the closure at closures in position.

For example in the embodiment of FIG. 3, the body wall of the container is of stainless steel 0.8 mm thick and the overall dimensions of the cross-section of the mouth ring 5 are 40 mm × 25 mm. The diameter of the open mouth of the container is 580 mm. The embodiment of FIG. 6 has similar dimensions.

In FIGS. 5 and 8 the body wall of the container is again 0.8 mm thick stainless steel and the metal strip from which the mouth ring is shaped is much thicker, being 3 mm stainless steel strip.

The preferred containers described by way of example are for transporting food products in bulk. For example such a container may have a capacity of about 200 liters. The invention can be applied however to much smaller containers for example for retail sale of food products and would provide a re-usable container which could be easily opened by the housewife who would discard the closure as scrap and could wash the container and return it to the retailer who would then stack the containers and pass them back to the food manufacturer. Such containers can be used many times thereby effecting considerable saving in raw materials.

The invention thus provides advantageous reusable containers which can be made of conventional materials for example stainless steel, laquered tin-plate or aluminium, with a closure of compatiable material, usually tin-plate material. When a sealing ring of resilient sealing material is employed, for example synthetic rubber, the ring could also be re-usable.

The containers are particularly suitable for the bulk transporting and storing of liquid or pasty food products for example tomato paste, concentrated fruit pulp, or fruit juice.

I claim:

1. In a combination of a re-usable container having an open-ended body with a mouth ring attached to an open end of the body and a closure, the improvement comprising: said ring being substantially thicker than the body wall of the container and the closure, a continuous internal surface of the mouth ring being shaped in a generally U-shaped configuration to receive and to lock in position an upstanding peripheral flange on said closure for the open end of the container body, said closure and said ring having generally parallel sealing surfaces and a resilient seal disposed between said parallel sealing surfaces for compression therebetween.

2. A container according to claim 1, wherein said internal surface of the mouth ring is formed with an outwardly sloping face which extends upwardly for receiving said upstanding peripheral flange, and an inwardly directed annular barb at the top of that face for latching over the edge of said peripheral flange.

3. The container of claim 2 wherein one outer surface of said U-shaped member is formed with an inwardly sloping face, extending upwardly, whereby said inwardly sloping face is adapted to engage a compatible face of a sealing device to achieve a sealing engagement therewith during filling and closure of said container.

4. In a combination of a re-usable container having an open-ended body with a mouth ring attached to an open end of the body and a closure, the improvement comprising: said mouth ring being substantially thicker than the body wall of the container and the closure, the mouth ring having a continuous internal surface shaped to receive and lock in position an upstanding peripheral flange on said closure for the open end of the container body, said closure and said mouth ring having generally parallel surfaces, and a resilient seal disposed between said parallel surfaces for compression therebetween.

5. A container according to claim 4, wherein the mouth ring is formed with an upwardly-facing groove which constitutes a seating for an O-ring of resilient sealing material on to which said sealing surface of the closure may be pressed.

6. In a combination of a re-usable container having an openended body with a circular mouth ring attached to an open end of the body and a closure for the open end of the container body, the improvement comprising:
   a. said mouth ring being substantially thicker than the body wall of the container and the closure;
   b. said mouth ring being of generally L-shaped radial cross-section the foot of which cross-section is bonded to the body wall of the container and said cross-section defining an annular recess in the inner surface of the mouth ring which recess is of generally U-shaped configuration to receive and lock in position an upstanding peripheral flange on said closure;
   c. said closure and said ring having generally parallel surfaces; and
   d. A resilient seal being disposed between said parallel surfaces for compression therebetween to provide a seal preserving aseptic conditions within the container.

7. The combination of claim 6, in which one of said parallel surfaces is an upper surface provided on the foot of said L-shaped radial cross-section mouth ring which foot is formed as an upstanding annular shoulder, the other of said parallel surfaces is a downwardly-facing inner surface of an annular recess in the closure, and the resilient seal is an annular sealing membr which adheres to said downwardly-facing inner surface of said annular recess in the closure for compression between said upper surface on said upstanding annular shoulder and said downwardly-facing inner surface of said annular recess.

8. The combination of a re-usable container for sterile food products which are fed into the container under aseptic conditions, and a closure for an open end of the container, comprising:
   a. a container having an open-ended body with a mouth ring attached to the open end of the body, said mouth ring being substantially thicker than the body wall of the container and the closure;
   b. the mouth ring of the internal surface shaped with an annular recess of generally U-shaped configuration with an outwardly sloping face which extends upwardly for receiving an upstanding peripheral flange on said closure and an inwardly directed barb at the top of that face for latching over the edge of said peripheral flange when the closure is pressed down into said open end of the container body by the action of a tool carrying the closure and causing the closure to penetrate said mouth ring;
   c. said recess being delimited internally from the mouth ring by an annular shoulder having an upper sealing surface which co-operates with a generally parallel sealing surface disposed inside an annular recess in the closure; and
   d. an annular sealing member adhered to said internal sealing surface of said annular recess in the closure and compressed between said sealing surfaces by the locking of said peripheral flange beneath the annular barb on said mouth ring to provide, when the tool is withdrawn, an hermetic seal preserving the aseptic conditions within the container.

9. The combination of claim 8, wherein the mouth ring has a chamfered outer surface adapted to engage a compatible face of a sealing device to achieve a sealing engagement therewith during filling and closure of said container.

* * * * *